United States Patent
Maas et al.

(10) Patent No.: US 7,931,094 B2
(45) Date of Patent: *Apr. 26, 2011

(54) AERATION DEVICE

(75) Inventors: David R. Maas, Owatonna, MN (US); Scott W. Bjorge, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/824,596

(22) Filed: Jun. 28, 2010

(65) Prior Publication Data

US 2010/0263888 A1    Oct. 21, 2010

Related U.S. Application Data

(60) Continuation of application No. 12/208,784, filed on Sep. 11, 2008, now Pat. No. 7,743,841, which is a continuation of application No. 11/250,694, filed on Oct. 11, 2005, now Pat. No. 7,438,136, which is a division of application No. 10/387,092, filed on Mar. 12, 2003, now Pat. No. 7,096,968.

(60) Provisional application No. 60/363,786, filed on Mar. 12, 2002.

(51) Int. Cl.
*A01B 45/02* (2006.01)

(52) U.S. Cl. ........................................ 172/21; 172/118

(58) Field of Classification Search ................ 172/1, 21, 172/22, 35, 42, 48, 79, 118, 121, 122, 123, 172/125

See application file for complete search history.

(56) References Cited

U.S. PATENT DOCUMENTS

| | | |
|---|---|---|
| 2,041,208 A | 5/1936 | Rienks |
| 2,111,478 A | 3/1938 | McGuire |
| 2,347,748 A | 5/1944 | Melling |
| 3,650,331 A | 3/1972 | Dedoes |
| 3,707,132 A | 12/1972 | Hansen |
| 3,877,401 A | 4/1975 | Gutman |
| 3,939,917 A | 2/1976 | Reed, Jr. et al. |
| 4,081,034 A | 3/1978 | Hines |
| 4,084,642 A | 4/1978 | Killion |
| 4,148,362 A | 4/1979 | Orth |
| 4,158,391 A | 6/1979 | Clements |
| 4,192,387 A | 3/1980 | Stinson |
| 4,212,357 A | 7/1980 | Clements et al. |
| RE30,705 E | 8/1981 | Hines |
| 4,336,760 A | 6/1982 | Cohen et al. |
| 4,346,764 A | 8/1982 | Rossi |
| 4,383,580 A | 5/1983 | Huxford |
| 4,489,787 A | 12/1984 | Gary |
| 4,538,689 A | 9/1985 | Dietrich, Sr. |
| 4,550,783 A | 11/1985 | Hansen |

(Continued)

*Primary Examiner* — Thomas B Will
*Assistant Examiner* — Jamie L McGowan
(74) *Attorney, Agent, or Firm* — Fish & Richardson P.C.

(57) ABSTRACT

A soil aeration device may include a plurality of arcuate blades mounted to an assembly adapted to rotate and translate the blades proximate a ground surface, thereby forming aeration pockets in the soil. In certain embodiments, the arcuate tines penetrate and fracture the soil while minimizing the amount of soil lifted from the pocket deposited on the top of the soil. In various embodiments, a planetary gear assembly imparts to the tine a translational and rotational movement which creates a fractured pocket in the soil while minimizing the amount of soil lifted from the pocket and deposited on the surface of the soil. In still other embodiments, the arcuate tine may have mounted thereon a coring tube that cuts and removes a plug from the pocket formed in the soil.

12 Claims, 10 Drawing Sheets

U.S. PATENT DOCUMENTS

| | | |
|---|---|---|
| 4,619,329 A | 10/1986 | Gorbett |
| 4,662,456 A | 5/1987 | Classen |
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,840,232 A | 6/1989 | Mayer |
| 4,899,828 A | 2/1990 | Harris |
| 4,910,948 A | 3/1990 | Nelson |
| 5,014,791 A | 5/1991 | Kure |
| 5,020,602 A | 6/1991 | Dellinger |
| 5,029,652 A | 7/1991 | Whitfield |
| 5,036,655 A | 8/1991 | Holloway |
| 5,101,910 A | 4/1992 | Dawson |
| 5,119,880 A | 6/1992 | Zehrung, Jr. et al. |
| 5,152,348 A | 10/1992 | Flanagan, Sr. et al. |
| 5,172,768 A | 12/1992 | Straus |
| 5,207,278 A | 5/1993 | Hatlen |
| 5,209,306 A | 5/1993 | Whitfield |
| 5,398,767 A | 3/1995 | Warke |
| 5,398,768 A | 3/1995 | Staples |
| 5,460,229 A | 10/1995 | Mattis |
| 5,469,922 A | 11/1995 | Bjorge |
| 5,570,746 A | 11/1996 | Jones et al. |
| 5,579,847 A | 12/1996 | Postema |
| 5,586,604 A | 12/1996 | Postema |
| 5,615,744 A | 4/1997 | Krafka |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,765,645 A | 6/1998 | Postema |
| 5,769,169 A | 6/1998 | Miksitz |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 5,937,953 A | 8/1999 | Melberg et al. |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,102,129 A | 8/2000 | Classen |
| 6,179,061 B1 | 1/2001 | Fiore |
| 6,241,025 B1 | 6/2001 | Myers et al. |
| 6,273,197 B1 | 8/2001 | Marlow |
| 6,321,849 B1 | 11/2001 | Underhill |
| 6,415,872 B2 | 7/2002 | Myers et al. |
| 6,659,190 B2 | 12/2003 | Jessen |
| 6,758,283 B2 | 7/2004 | Lauer et al. |
| 6,805,205 B1 | 10/2004 | Gabard |
| 7,096,968 B2 | 8/2006 | Maas et al. |
| 7,152,691 B2 | 12/2006 | Maas et al. |
| 7,743,841 B2 * | 6/2010 | Maas et al. ............ 172/22 |
| 2006/0225899 A1 | 10/2006 | Maas et al. |

* cited by examiner

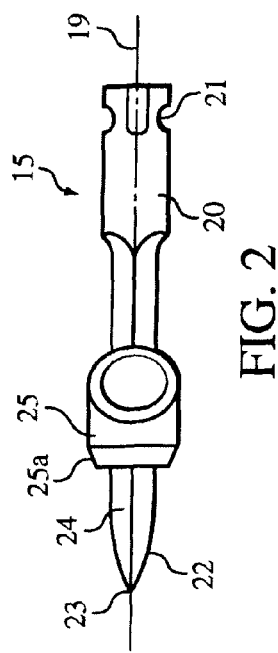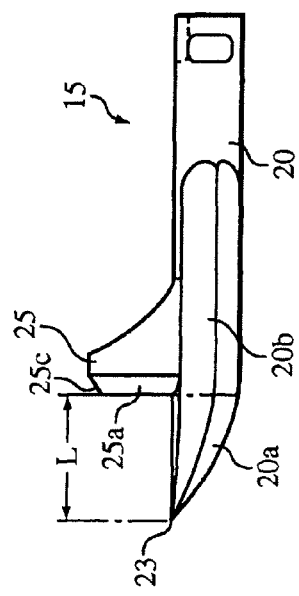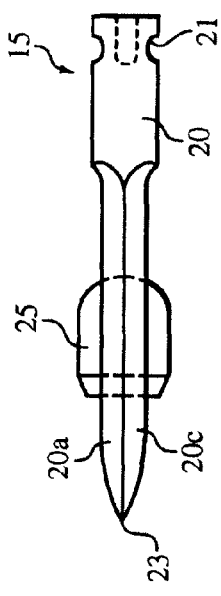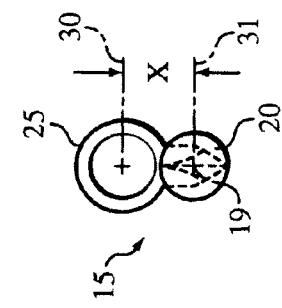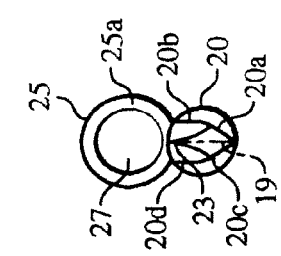

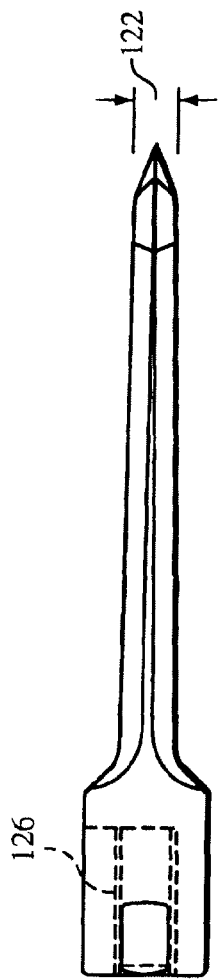
FIG. 13
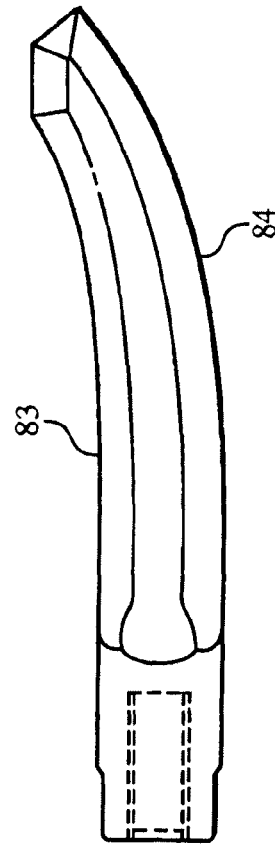
FIG. 15
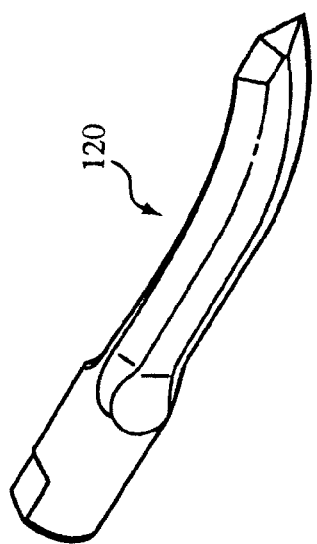
FIG. 12
FIG. 14

AERATION DEVICE

CROSS REFERENCE TO RELATED APPLICATIONS

This application is a continuation application of U.S. application Ser. No. 12/208,784, filed on Sep. 11, 2008 now U.S. Pat. No 7,743,841 and entitled "Aeration Device," which is a continuation of U.S. application Ser. No. 11/250,694, filed on Oct. 11, 2005 now U.S. Pat. No. 7,438,136 and entitled "Aeration Device," which is a divisional of application Ser. No. 10/387,092, filed on Mar. 12, 2003 now U.S. Pat. No. 7,096,968 and entitled "Aeration Device," which claims priority from U.S. Provisional Application No. 60/363,786, filed Mar. 12, 2002 and entitled "Aeration Device," the entirety of which are incorporated by reference herein.

BACKGROUND

Soil aeration devices are generally designed to cut a plug out of the soil instead of driving a spike into the soil because the latter approach compacts the soil. Towable soil aerator devices typically remove plugs of soil while forming an enlarged soil aeration pocket. Such aerators include hollow cylindrical tubes that enter the soil at an angle to cut free a cylindrical soil plug which contains grass, grass roots and soil. As the soil aeration device moves forward, planetary gears in the soil aeration device cause the soil aeration tubes to pivot to form a soil aeration hole or pocket wherein the bottom portion of the soil aeration hole is larger than the top opening of the soil aeration hole. The soil aeration tube is then lifted out of the soil to remove the soil plug, which is usually discarded on top of the soil. One of the difficulties with soil aeration devices is that a substantial amount of soil, grass and roots in the form of cylindrical plugs are left on top of the soil. These soil plugs must either be removed, allowed to decompose, or pulverized via mowing. Generally, the larger the soil plugs, the longer it takes for the soil plugs to decompose naturally.

DESCRIPTION OF DRAWINGS

FIG. 2 is a top view of an aeration tine;

FIG. 3 is a side view of the aeration tine of FIG. 2;

FIG. 3a is a front view of the aeration tine of FIG. 2;

FIG. 3b is a back view of the aeration tine of FIG. 2;

FIG. 4 is a bottom view of the aeration tine of FIG. 2;

FIG. 12 is a perspective view of yet another embodiment of an aeration tine;

FIG. 13 is a top view of the aeration tine of FIG. 12;

FIG. 14 is an end view of the aeration tine of FIG. 12;

FIG. 15 is a side view of the aeration tine of FIG. 12;

SUMMARY

A soil aeration device may include a plurality of arcuate blades mounted to an assembly adapted to rotate and translate the blades proximate a ground surface, thereby forming aeration pockets in the soil. In certain embodiments, the arcuate tines penetrate and fracture the soil while minimizing the amount of soil lifted from the pocket deposited on the top of the soil. In various embodiments, a planetary gear assembly imparts to the tine a translational and rotational movement which creates a fractured pocket in the soil while minimizing the amount of soil lifted from the pocket and deposited on the surface of the soil. In still other embodiments, the arcuate tine may have mounted thereon a coring tube that cuts and removes a plug from the pocket formed in the soil.

The apparatus described herein may provide one or more of the following advantages. In certain embodiments, the soil aeration device enables a grassy area such as a golf course fairway to be aerated without the deposition of the plugs or significant amounts of soil on the grass, thereby permitting use of the fairway immediately after aeration without the need to remove or mow soil plugs or otherwise treat the area. In some embodiments, the translational and rotational movement imparted to an arcuate coring tine minimizes the size of the aperture cut in the soil and the amount of soil lifted from the aeration pocket and deposited on the surface of the ground.

The details of one or more embodiments are set forth in the accompanying drawings and the description below. Other features, objects, and advantages of the invention will be apparent from the description and drawings, and from the claims.

DETAILED DESCRIPTION OF ILLUSTRATIVE EMBODIMENTS

Figure 1:
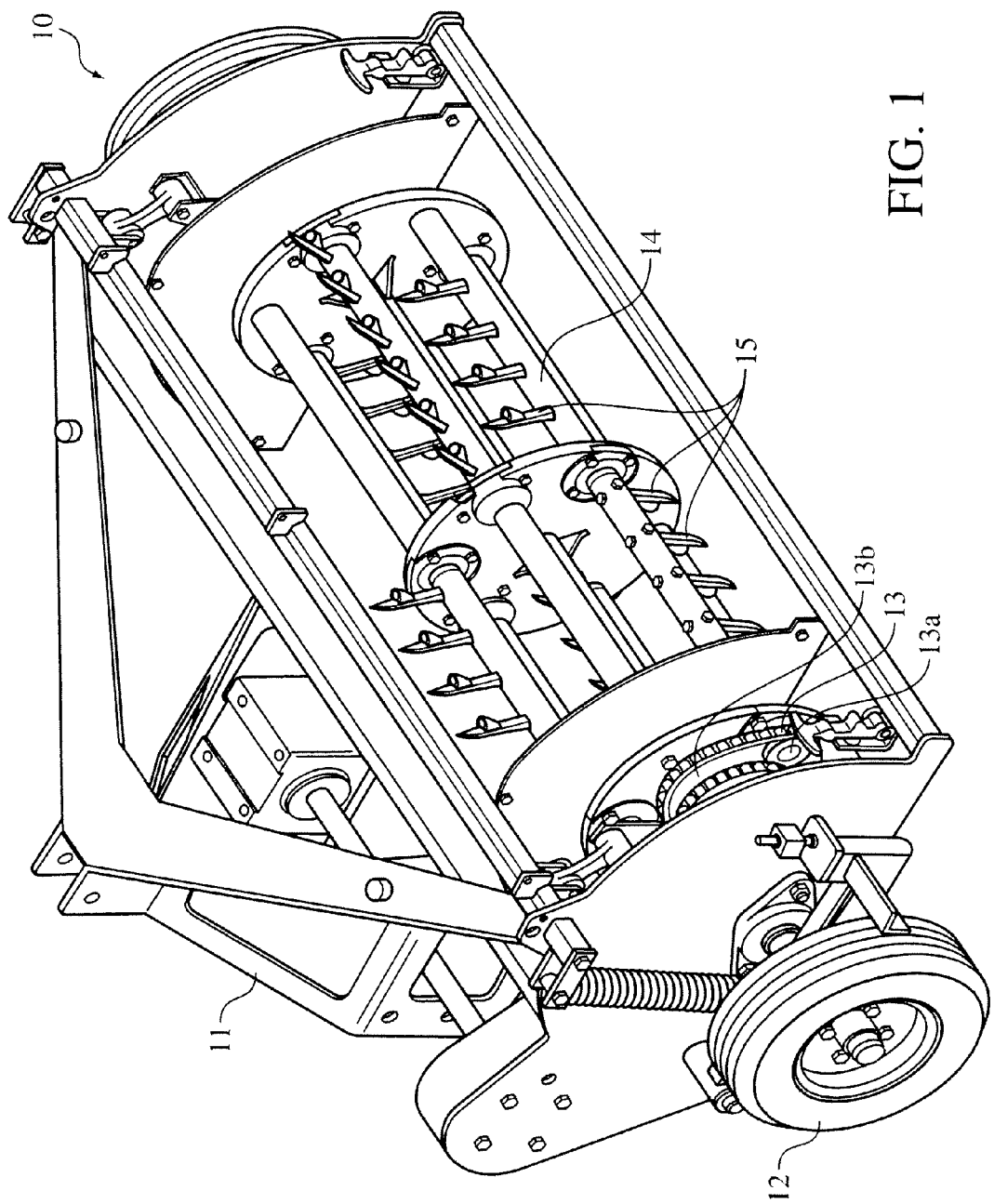
FIG. 1 is a perspective of a soil aerator device having a set of aeration tines.

FIG. 1 is a perspective view of a pull type soil aeration device 10 having a frame 11 supported by a pair of wheels 12. A gear mechanism 13, which is connected to the power take off shaft of a tractor (not shown), rotates the tine holders 14 which contain a set of soil aeration tines 15. In the embodiment shown the aeration tines are located on parallel members and rotate in an epicycle or planetary manner. A soil aeration device providing planetary motion is more fully described in Bjorge U.S. Pat. No. 5,469,922 titled Soil Aerator issued Nov. 28, 1995 and is incorporated herein by reference.

FIG. 2 shows a top view of soil aeration tine 15 capable of both fracturing and removing soil. Soil aeration tine 15 comprises an elongated member 20 having a central axis 19. Elongated member 20 has a first section 22 terminating in an apex end 23 and a second section or mounting end 21 for mounting elongated member 20 on a soil aeration device. Mounted to elongated member 20 is a cylindrical soil cutting tube 25 which is positioned rearwardly or aft of apex end 23 so that when apex end 23 of elongated member 20 is axially driven into a patch of soil the apex end 23 of elongated member 20 penetrates the patch of soil before the soil cutting tube 25 engages the soil. As the first section 22 penetrates the soil it fractures the soil to form a partial soil aeration pocket. Next, the soil 20 cutting tube 25 which is positioned axially rearwardly of the apex 23 and has an annular cutting edge 25c and a conically tapered surface 25a engages the soil aft of the apex end and proximate the soil aeration tine 15 to cut a plug of the soil free of the soil. Thus the fracturing of the soil occurs in the soil around the lower portion of the hole and both fracturing and soil removal occurs in the soil zone proximate the cutting tube which results in a soil aeration pocket in the soil where the soil aeration pocket is larger than the soil plug cut free of the soil and also without the soil compaction that would occur if a spike were driven downward into the soil.

FIG. 3 shows a side view of soil aeration tine 20 illustrating a portion of a divergent soil fracturing section 22 which includes an upwardly curving soil fracturing face 20a and an upwardly curving soil fracturing face 20b that terminates at apex end 23. FIG. 3a shows the opposite side of soil aeration tine 15 illustrating the other side of the divergent soil fracturing section 22 which includes identical upwardly curving soil fracturing faces 20c and 20d that terminates at apex end 23. A soil lifting face 24 extends laterally from side-to side of soil aeration tine 15. The soil lifting face 24 forms a scoop or spade so that when the soil aeration tine is rotationally removed from the soil the soil face 24 can lift or scoop soil from the soil aeration pocket.

The soil cutting tube 25 has a leading and annular cutting edge 25c that diverges outwardly along annular face 25a to the cylindrical shaped soil cutting tube 25. The cutting edge 25c of cutting tube 25 is positioned a distance L rearward of the apex end 23 of soil aeration tine 15 to enable the soil fracturing section 22 to penetrate and fracture the soil before the soil aeration tube cuts a soil plug free of the soil. In the embodiment shown the soil cutting tube is positioned at least one and one half inches rearward of the apex end to ensure that the length of the soil plug is kept to a minimum. On the other hand the soil cutting tube should extend sufficiently far along elongated member 20 so as to ensure that one can cut through the top layer of grass and soil. Thus, in the embodiment shown in the drawings the end of the tine 15 lacks an end coring device.

FIG. 3b shows a back view of soil aeration tine 15 with a first line 31 extending outward from the central axis 19 of elongated member 20 and a second line 30 extending outward from the geometric center of cutting tube 25 with the distance between the centers indicated by the dimension x. That is, FIG. 3b illustrates that the cutting tube is laterally offset from the elongated member 20 so that cutting tube 20 and elongated member 20 enter the soil in a side by side condition.

FIG. 4 is a bottom view of soil aeration tine 15 illustrating that the soil fracturing faces 20a and 20c extend axially along elongated member 20 and terminate at apex end 23.

Thus the under side of aeration tine 15 presents soil fracturing surfaces 20a and 20c while the top side of soil aeration tine 15 presents the latterly offset and rearwardly positioned cutting tube 25 for cutting the soil to remove a plug of soil and grass.

Figure 5:
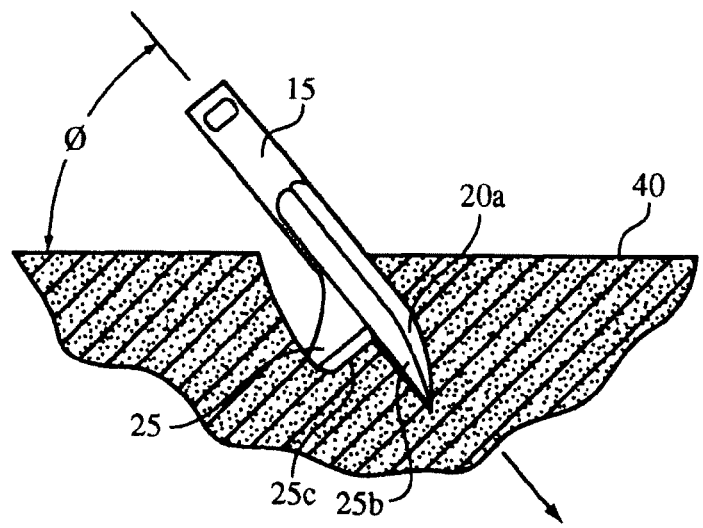
FIG. 5 is a partial side view showing the aeration tine of FIG. 2 penetrating the soil.

FIG. 5 is a partial schematic illustrating how soil aeration tine 15 penetrates a patch of soil 40 at an acute angle ϕ with respect to the top soil. In the first step the soil aeration soil fracturing surfaces 20a, 20b on one side of elongated member 20 and the soil fracturing surfaces 20c and 20 located on the opposite side of the elongated member penetrate the soil with the soil fracturing surfaces entering the soil at an acute angle causing the soil 40 proximate the soil aeration tine 15 to fracture upward rather than compact. That is the acute angle penetration of the soil fracturing surfaces with the fracturing surfaces facing upward produces an upward component that forces the soil upward. As the soil can fracture and move upward the resistance to soil compaction above the soil aeration tine 15 is less than the resistance to soil compaction in the lateral direction. That is, lateral displacing soil produces increased soil compaction since the soil must compact against itself. Thus avoiding direct lateral compaction inhibits soil compaction. At the same tine the soil fracturing faces fracture the portion of the soil located ahead of the soil aeration tine the cutting edge 25c, which trails the apex end 23, cuts a soil plug free of the soil. In the embodiment shown the cutting edge 25c extends substantially perpendicular to soil aeration tine 15 to enable the soil aeration tube 25 to capture a soil plug aft of the apex end 23 as the soil aeration tine 15 is driven axially into the soil. It should be pointed out that although multiple soil fracturing faces are shown it is envisioned that only a single soil fracturing surface could be used.

Figure 6:
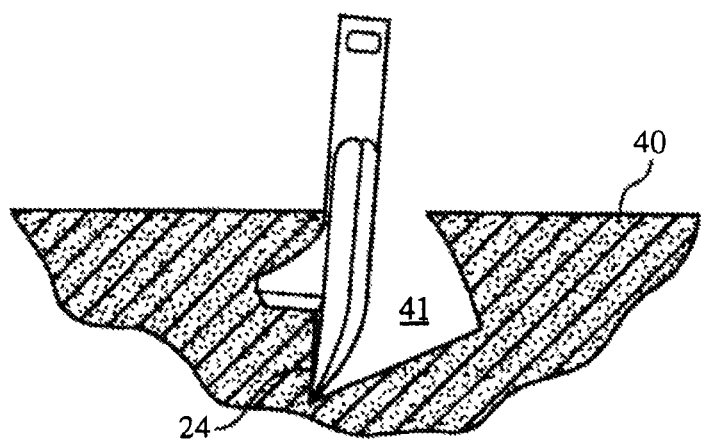
FIG. 6 is a partial side view showing the aeration tine of FIG. 2 partially rotated within the soil.
Figure 7:
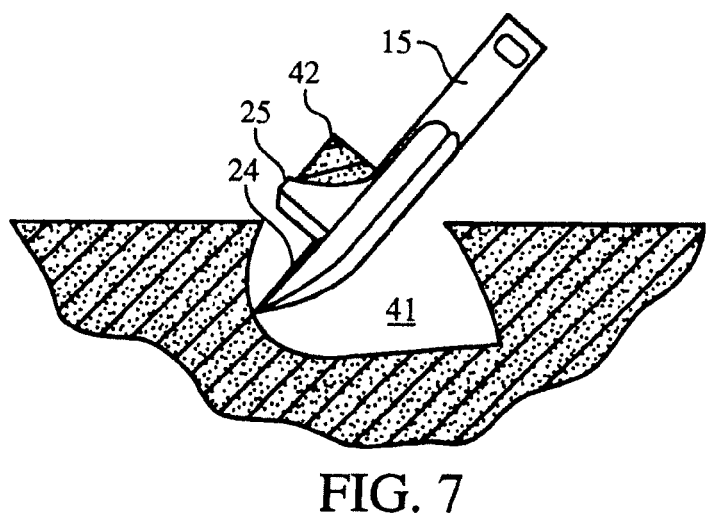
FIG. 7 is a partial side view showing the aeration tine of FIG. 2 emerging from the soil.
Figure 9:
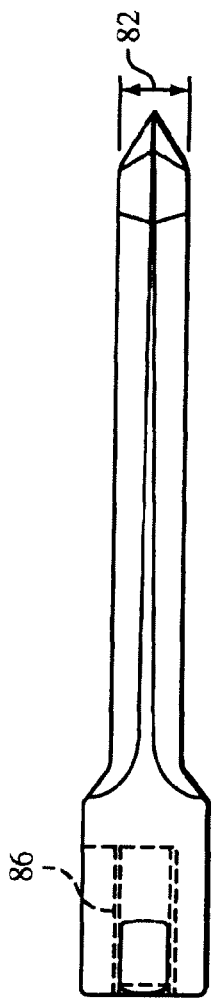
FIG. 9 is a top view of the aeration tine of FIG. 8.
Figure 11:
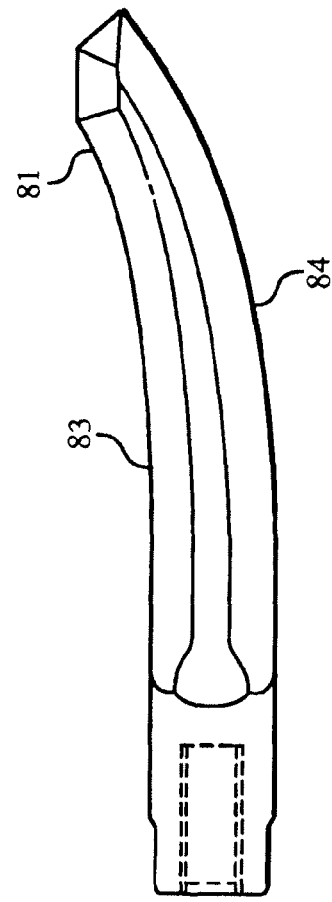
FIG. 11 is a side view of the aeration tine of FIG. 8.
Figure 8:
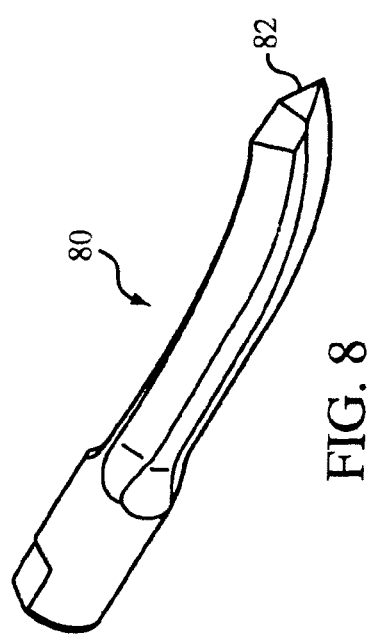
FIG. 8 is a perspective view of an alternate aeration tine.
Figure 10:
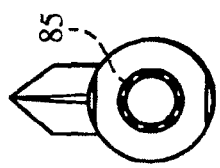
FIG. 10 is an end view of the aeration tine of FIG. 8.
Figure 17:
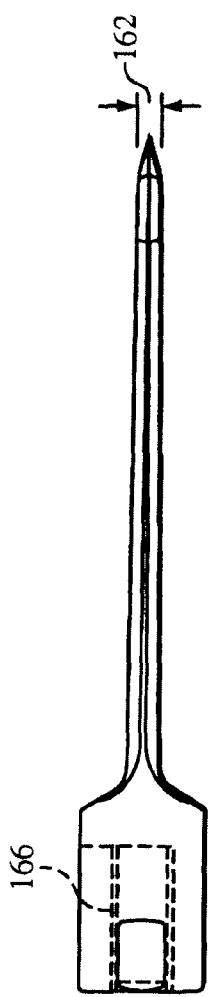
FIG. 17 is a top view of the aeration tine of FIG. 16.
Figure 19:
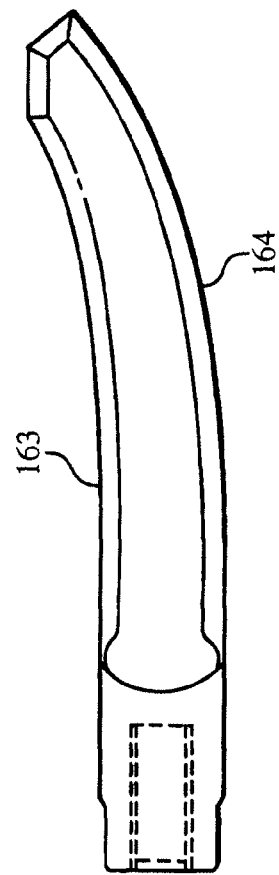
FIG. 19 is a side view of the aeration tine of FIG. 16.
Figure 16:
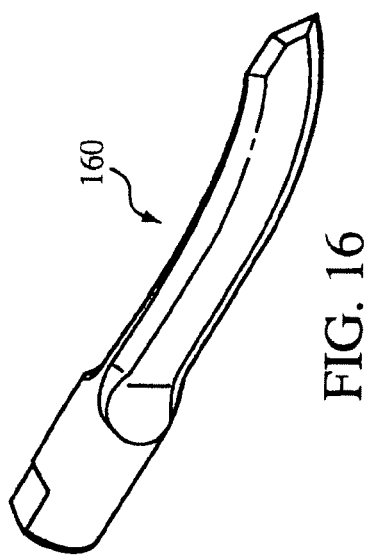
FIG. 16 is a perspective view of an aeration tine adapted for use on putting greens.
Figure 18:
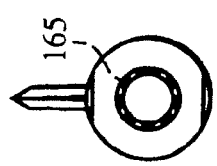
FIG. 18 is an end view of the aeration tine of FIG. 16.

FIG. 6 illustrates the step when the soil aeration tine is rotated in a clockwise direction as the tine is being moved forward. This rotational action results in an aeration pocket 41 being formed in the region first penetrated by the soil aeration tine. FIG. 7 illustrates the further enlargement of the soil aeration pocket 41 as the soil aeration tine 15 continues in a compound motion as a result of the planetary action that drives the tine rearward during the rotation of the support mechanism and forward due to the pulling of the soil aeration device and the rotation of the aeration tine. As a result, the compound rotation causes the soil aeration tine top face 24 to lift or scoop soil from the aeration pocket while a cut soil plug 42 is held in cutting tube 25 to be disposed of on the ground when the soil aeration tube 25 exits the soil. The result is that one can form a soil aeration pocket 41 with a minimum of soil compaction and a minimum of displaced soil as the soil aeration tine with the aft cutting tube removes a soil plug of substantially smaller volume than a soil aeration tube located on an apex end of a soil aeration tube. Consequently, less soil is left on top of the soil since the soil plugs formed by the present method are smaller than soil plugs formed by the end core method. Yet at the same tine the aeration holes 41 formed in the soil are as large or larger than holes formed by a conventional cylindrical cutting tubes.

Thus the method of making a soil aeration hole 41 comprises the step of extending an elongated member 20 having a lateral face 24 on one side and a soil diverging section formed by faces 20a and 20c on the other side into the soil to fracture the soil proximate the diverging faces. In addition, one cuts a soil plug free of the soil with the soil aeration tube 25 by cutting the soil plug from the soil located rearward and lateral of the diverging faces 20a and 20c. By rotationally removing the elongated member 20 one can free the soil plug and form a soil aeration hole 41 having a top opening smaller than a bottom opening as shown in FIG. 7. Also by rotationally removing the elongated member 20 with the apex end 23 and lifting surface 24 one can partially scoop out soil with the soil lifting face 24 on the elongated member.

In the embodiments shown the soil cutting tube 25 has an external diameter larger than the external diameter of the aerator tine. Although, it is submitted that the diameter of the soil cutting tube 25 can be governed by other factors such as soil types and soil conditions.

Thus the soil aerator tine 15 can include at least one soil fracturing face in a diverging section 22 which diverges in a direction rearward from an apex end 23 on soil aerator tine 15 and in a direction away from a lifting face 24 on soil aerator tine 15. The soil aeration device 15 illustrated in FIG. 3a shows two soil fracturing faces 20a and 20c symmetrically positioned around a central axis 19 extending through the soil aeration tine elongated member 20. A review of FIG. 3a shows that apex end 23 on soil aeration tine 15 is located lateral of the central axis 19 extending through the soil aeration tine 15. By having the soil diverging faces forming an off center apex 23 on one side of the soil aeration tine 15 the soil against the soil face 24 is penetrated without compaction while the soil above the soil aeration fracture faces is forced away from the soil aeration tube. When the soil aeration tube is driven at an acute angle into the soil the diverging fracturing surfaces move the soil upward which fractures the soil without compacting the soil.

FIGS. 8-11 depict an aeration blade 80 adapted for use in connection with the above-described aeration device 10. The blade 80 functions similarly to the aeration tine 15 discussed above, except that it does not cut and remove a plug of soil. The arcuate tine 80 penetrates the soil as shown and described in connection with FIGS. 5-7, but because this blade lacks the soil cutting tube 25, no plug is removed from the soil and deposited on the surface of the aerated turf. Rather, as the aeration tine 80 pivots in the motion shown in FIGS. 5-7, the arcuate end 81 of the aeration tine 80 cuts an aeration groove having a longer dimension in the direction of the cut, which provides a degree of aeration comparable to that provided by aeration tine 15.

Figure 20:
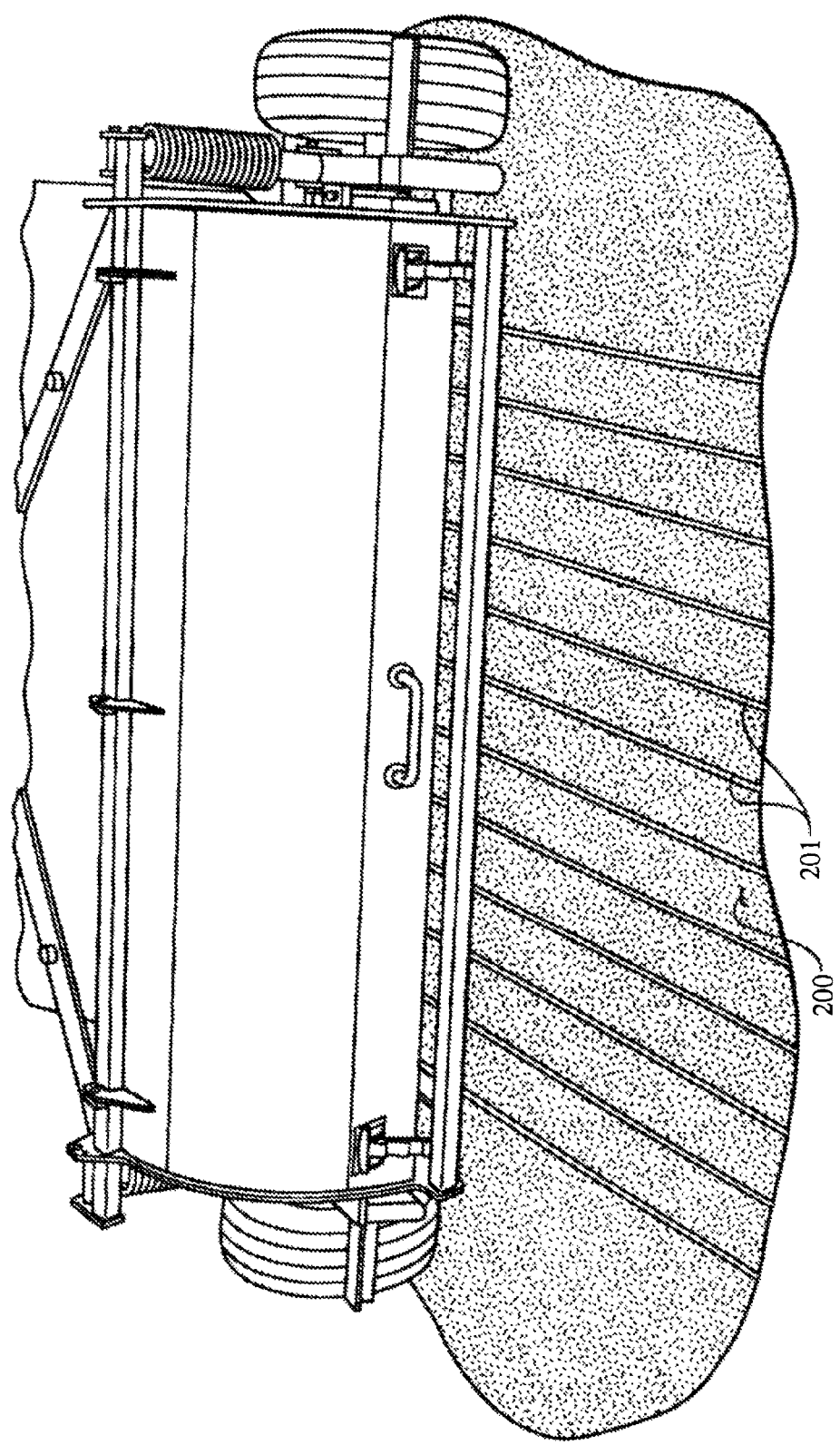
FIG. 20 depicts a golf course green that has been aerated with the aeration tine of FIG. 16.

Moreover, turf aerated with tine 80 will not be littered with aeration plugs. As shown in FIG. 20, the surface 200 of the aerated turf remains substantially uniform. The aeration pockets 201 are visible, but no significant amount of soil has been deposited on the grass surface 200. Accordingly, the turf need not be further treated (as by mowing) before receiving approach shots or serving as a putting surface. The aeration tine 80 can thus be advantageously implemented to significantly reduce maintenance expenditures and virtually eliminate course downtime caused by aeration procedures.

Returning to FIGS. 8-11, the aeration blade 80 has a tip 82, concave edge 83, and convex edge 84. The cavity 85 is adapted to be received onto a mounting element (not shown) protruding from tine holders 14 of the soil aeration device 10. The blade 80 may be made of high strength steel, metal alloys, composites, hard polymeric materials, or other suitable materials. The cavity 85 may include threads, keys, detents, cross-drilled tapped holes for set screws, or other suitable structure that cooperates with the mounting elements on tine holders 14 to securely and releaseably hold blades 80. Releaseable mounting configurations advantageously facilitate removal of blades 80 for sharpening or replacement.

The aeration tine 80 of FIGS. 8-11 has a width 82 of approximately 7/16".

The aeration tines of FIGS. 12-15 are similar to the tine of FIGS. 8-11, except that the tine of FIGS. 12-15 has a width 122 of approximately 5/16". The tine of FIGS. 16-19 has a width 162 of approximately 1/8" and is adapted for aeration of surfaces which must remain particular flat and even after aeration, such as putting greens.

Figure 21:
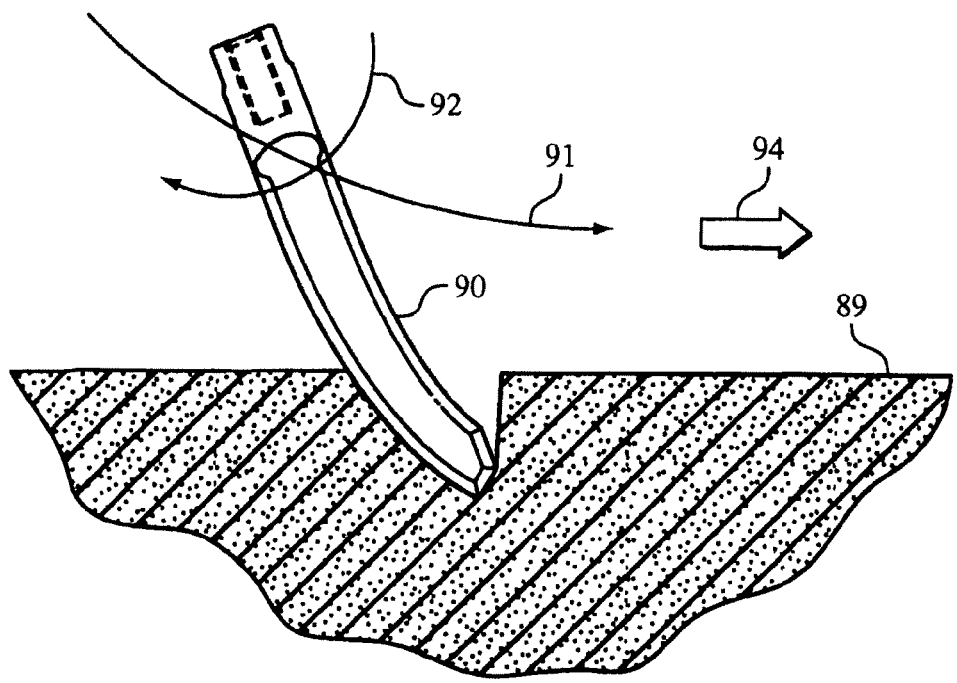
FIGS. 21-24 depict the planetary motion of arcuate tines in certain embodiments.

The operation of the arcuate aeration blades are shown in more detail in FIGS. 21-24. With reference to FIG. 21, an arcuate aeration blade 90 penetrates soil 89 in a downward, clockwise motion 92. As the tractor proceeds in the direction shown by arrow 94, the planet gear (not shown) that drives the blade 90 rotates in clockwise direction (as shown by arrow 92) while being driven in a counterclockwise planetary direction (as indicated by arrow 91). As the tractor continues in the direction of arrow 94, the blade 90 translates in the direction of arrow 91 while continuing to rotate in the direction indicted by arrow 92, thus carving an aeration pocket and causing soil fractures 93. Optionally, the blade 90 can be mounted in the opposite direction, such that its longer blade edge end faces in direction 94. Such an arrangement can be usefully employed to, for instance, lift soil from the aeration pocket, thereby increasing the pocket's size.

Figure 22:
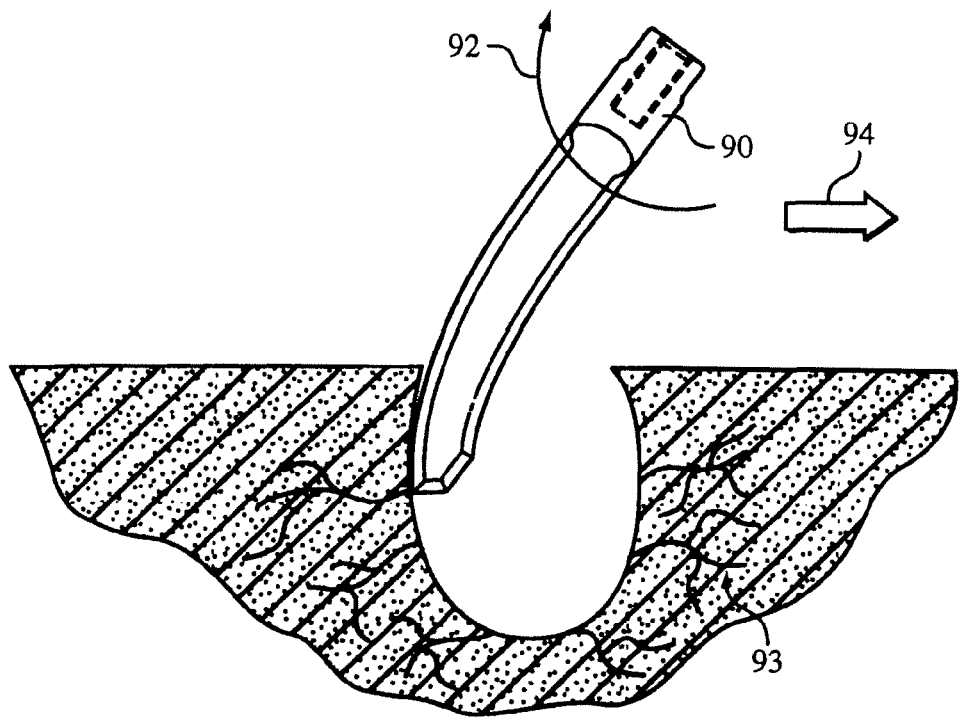
Figure 23:
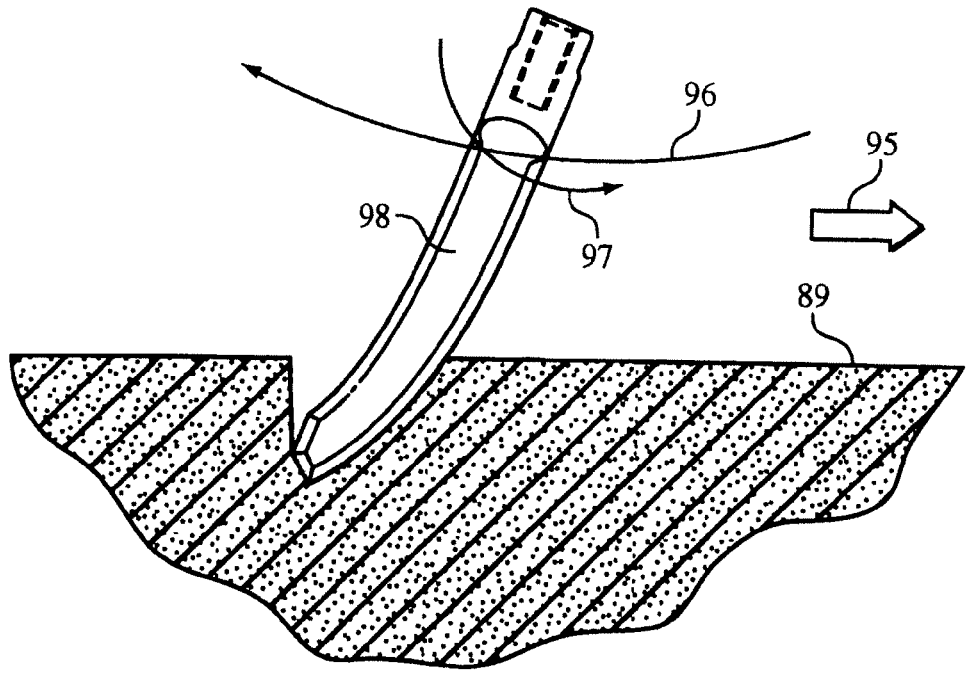
Figure 24:
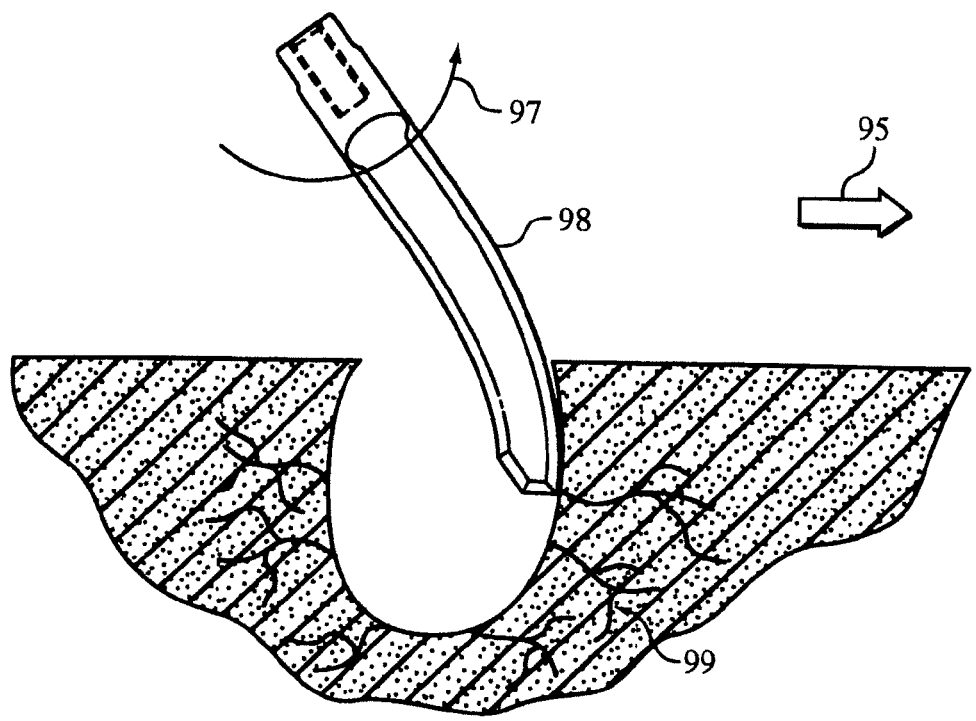

FIGS. 23-24 depict an embodiment in which the planetary motion is reversed relative to that shown in FIGS. 21-22. The blade 98 plunges downward into the soil 89 as it translates in the direction of arrow 96 and rotates in a counter-clockwise direction, as indicated by arrow 97. As the tractor proceeds in the direction of arrow 95, the blade 98 continues to translate and rotate in the aforementioned directions, thereby forming a pocket and soil fractures 99.

Figure 25:
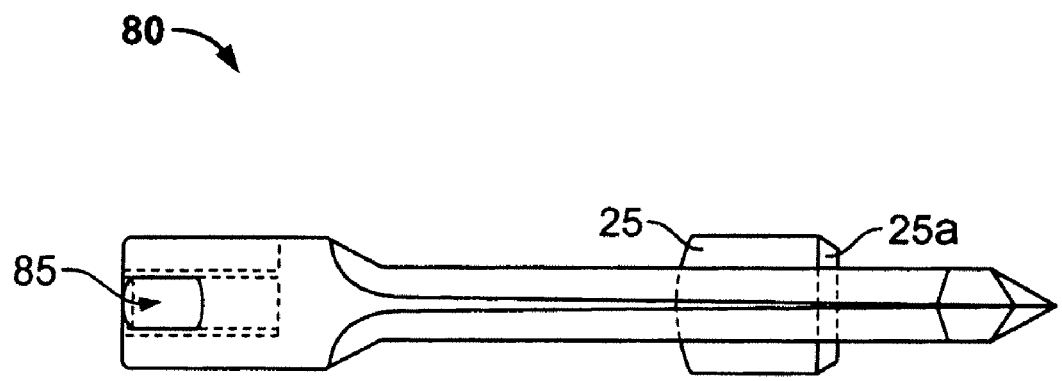
FIGS. 25-26 depict a top view and a side view, respectively, of another embodiment of an aeration tine.
Figure 26:
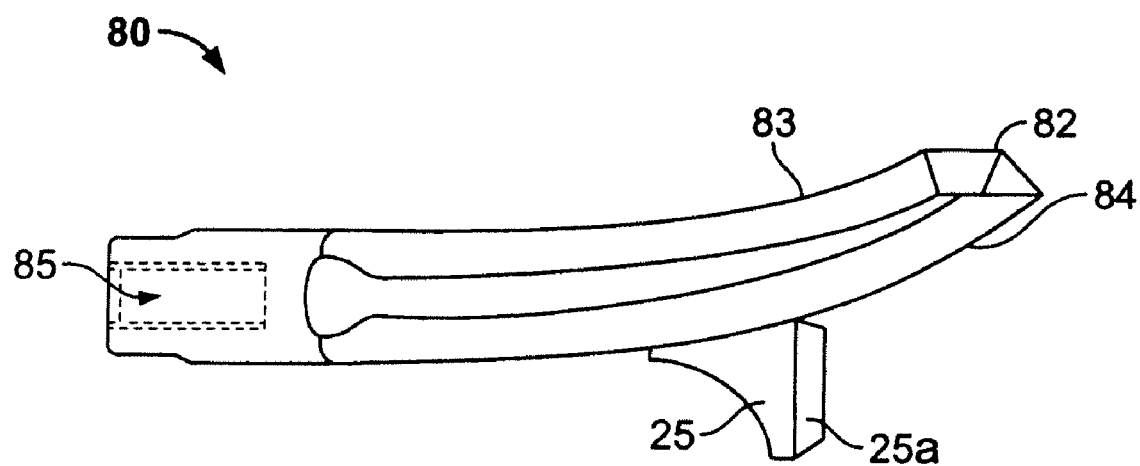

The blade 80 can be equipped with an aeration tube 25 on its trailing or leading edges, as shown in FIGS. 25-26. In such embodiments, the arcuate blade serves to fracture the soil which is compacted by the soil aeration tube 25.

Various additional modifications can be advantageously made to the apparatus described above in accordance with the teachings set forth herein. For instance, the edge on the concave side of the aeration blade 80 can be replaced with a blunt surface. As noted above, the aeration blades tines can be oriented as shown in the figures, or they can be rotated 180 degrees about the long axis of the blade. The planetary gear set can be modified to have any desired combination of clockwise and counter-clockwise motions of the planet gear 13a and sun gear 13b so that, for instance, both the translation and rotation of the blade are in a clockwise direction. The gear ratios and sizes can be freely modified to create pockets having different profiles and fractures. The tines can be grouped or staggered on the tine holders in any fashion desired. For example, the tines can be grouped in pairs or triplets along the tine holders. The tines can also be disposed at a angle relative to the vertical plane defined by the pocket shown in FIGS. 21-24 to accomplish a different type of soil fracturing.

A number of embodiments of the invention have been described. Nevertheless, it will be understood that various modifications may be made without departing from the spirit and scope of the invention.

What is claimed is:
1. An aeration tine, comprising:
a mounting portion including a mounting cavity that extends substantially straight along a longitudinal axis, the mounting portion comprising a cylindrical outer surface extending coaxially with the longitudinal axis of the mounting cavity; and
a curved blade member extending longitudinally from the mounting portion such that the curved blade member is positioned distal of the mounting cavity, the curved blade member including opposing parallel side surfaces that define a generally constant width of the curved blade member along a majority of a longitudinal length of the curved blade member, a concave blade edge facing laterally away from the opposing parallel side surfaces, a convex blade edge facing laterally away from opposing parallel side surfaces in a direction that is generally opposite from the concave blade edge, wherein the concave blade edge and the convex blade edge converge toward a distal tip portion so that, when the curved blade member is urged in a compound motion through a ground surface, at least one of the concave blade edge and convex blade edge fractures soil to form an aeration pocket.
2. The tine of claim 1, wherein the opposing parallel side surfaces define the generally constant width of the curved blade member which is less than a diameter of the cylindrical outer surface of the mounting portion.

3. The tine of claim 2, wherein the mounting portion is wider than the generally constant width of the curved blade member along the majority of the longitudinal length of the curved blade member, and wherein the longitudinal length of the curved blade member is greater than a longitudinal length of the mounting portion.

4. The tine of claim 3, wherein the generally constant width of the curved blade member along the majority of the longitudinal length of the curved blade member is equal to or less than about 7/16 inch.

5. The tine of claim 4, wherein the generally constant width of the curved blade member along the majority of the longitudinal length of the curved blade member is equal to or less than about 5/16 inch.

6. The tine of claim 5, wherein the generally constant width of the curved blade member along the majority of the longitudinal length of the curved blade member is equal to or less than about 1/8 inch.

7. The tine of claim 1, wherein when the curved blade member is urged in the compound motion through the ground surface, the convex blade edge cuts through the soil and forms the aeration pocket with no significant amount of soil deposited on the ground surface.

8. The tine of claim 1, wherein the curved blade member is adapted to be urged in a compound motion as it penetrates the ground surface, the compound motion including a rotational motion about a first axis and an revolving motion about a second axis.

9. The tine of claim 1, wherein the mounting cavity is releasably mountable to a tine holder member configured to retain a plurality of aeration tines.

10. The tine of claim 9, wherein the mounting cavity comprises a threaded cavity.

11. The tine of claim 1, further comprising an aeration tube coupled to the curved blade member at one of the convex blade edge or the concave blade edge, the aeration tube being operable to remove a soil plug when the curved blade member fractures soil and forms the aeration pocket.

12. The tine of claim 11, wherein the aeration tube is coupled to the curved blade member at a location spaced apart from the distal tip portion.

* * * * *